United States Patent [19]
Teske et al.

[11] Patent Number: 5,255,747
[45] Date of Patent: Oct. 26, 1993

[54] COMPRESSED AIR FOAM SYSTEM

[75] Inventors: Richard E. Teske, Norristown; Michael A. Laskaras, Collegeville, both of Pa.

[73] Assignee: Hale Fire Pump Company, Conshohocken, Pa.

[21] Appl. No.: 955,322

[22] Filed: Oct. 1, 1992

[51] Int. Cl.⁵ .................................. A62C 35/00
[52] U.S. Cl. ............................... 169/15; 169/24
[58] Field of Search ......................... 169/13-15, 169/24, 44

[56] References Cited

U.S. PATENT DOCUMENTS

| | | | |
|---|---|---|---|
| 2,146,605 | 2/1939 | Timpson | 165/15 |
| 2,183,561 | 12/1939 | Hamblin | 169/15 X |
| 2,769,500 | 11/1956 | Clifford | 169/15 |
| 2,936,835 | 5/1960 | Sheppard | 169/15 X |
| 3,811,660 | 5/1974 | Cole, Jr. | 169/15 X |
| 4,345,654 | 8/1982 | Carr | 169/14 X |
| 4,981,178 | 1/1991 | Bundy | 169/15 X |
| 5,031,834 | 7/1991 | Simpson | 169/15 X |
| 5,096,389 | 3/1992 | Grady | 169/14 X |
| 5,113,945 | 5/1992 | Cable | 169/14 X |
| 5,145,014 | 9/1992 | Eberhardt | 169/14 |

FOREIGN PATENT DOCUMENTS

| | | | |
|---|---|---|---|
| 589655 | 12/1959 | Canada | 169/14 |
| 901026 | 1/1954 | Fed. Rep. of Germany | 169/15 |
| 936492 | 12/1955 | Fed. Rep. of Germany | 169/15 |
| 51801 | 12/1941 | Netherlands | 169/15 |
| 239121 | 12/1945 | Switzerland | 169/44 |
| 228878 | 10/1968 | U.S.S.R. | 169/14 |

*Primary Examiner*—David M. Mitchell
*Assistant Examiner*—Andrew C. Pike
*Attorney, Agent, or Firm*—Frank A. Follmer

[57] ABSTRACT

A system for supplying compressed air and foam to produce a first stream comprising an aerated foam is disclosed. The system includes a fire pump, an air compressor, a venturi, and a control for automatically maintaining a desired ratio of air and water delivered from the venturi to a fire stream delivery device.

12 Claims, 5 Drawing Sheets

COMPRESSED AIR FOAM SYSTEM

FIELD OF THE INVENTION

This invention relates generally to foam supply systems for fire fighting applications, and, more particularly, to a system for supplying compressed air and foam to produce a fire stream comprising an aerated foam.

BACKGROUND OF THE INVENTION

Foam supply systems of the above-indicated type are known in the art by the term CAFS (Compressed Air Foam System) and WEPS (Water Expansion Pumping System). A typical system includes a foam injector system, a water pumping system, and an air system including an air compressor for supplying air under pressure. For example, when employing mixture ratios of 1 CFM of air to 1 GPM of water, these systems can produce very desirable results in fire fighting by the use of "Class A" or "Class B" foams to help achieve fire suppression and to deal with increased fire loads and related hazards.

With the present day systems of the indicated type it is difficult under fire fighting conditions to maintain the water pressure and the air pressure at desired levels. At a fire fighting scene, unless an operator is present at all times to observe the flow conditions and is skilled at operating the equipment to make the necessary adjustments thereof, it is possible for the system to run out of water, to run out of foam, to lose prime in the water pump, to mix air with water by itself without the foam concentrate, to put air into the system by itself, and to even overpressurize the air. The occurrence of any of the above events, in addition to the occurrence of other possible problems, can be hazardous to the firefighter.

SUMMARY OF THE INVENTION

It is the general object of the invention to provide a compressed air foam system for fire fighting applications designed to provide safe operation under all typical fire fighting conditions.

Another object of the invention is to provide a compressed air foam system which comprises control means to automatically maintain the air pressure delivered by the compressor at a desired relation to the water pressure delivered by the water pump.

Briefly stated, the above and other objects and features of the invention are achieved by the provision of a compressed air foam system comprising a fire pump for delivering water under pressure by way of a venturi means to a fire stream delivery means, a foam proportioner for delivering foam to the water being delivered through the venturi means to the fire stream delivery means, an air compressor for delivering air at a delivery pressure to the water/foam liquid being delivered through the venturi means, and an air control means for automatically maintaining a desired compressor air delivery pressure which is balanced with respect to the water pump delivery pressure. More specifically, the air control means comprises an air pressure regulator constructed and arranged to match the air pressure with the water pressure as the water pressure is varied during the fire fighting operation in order to achieve a balanced pressure relationship therebetween. To this end, the regulator is arranged to sense both the water pump delivery pressure and the air compressor delivery pressure and to modulate an air pressure signal used to vary the flow of air to the inlet of the air compressor so as to hold the water pressure and air pressure at the desired balanced relationship.

In accordance with another feature of the invention, there is provided an improved venturi means which is constructed and arranged so that a pintle is movable into and out of a converging throat section of the venturi means to provide a variable throat area. By this means, the same venturi means can be used over a wide range of flows to thereby adjust the ratio of water and air to provide different types of foams.

In accordance with another feature of the invention there is provided a safety means so that the air flow cannot be introduced into the foam system unless the fire pump is delivering water and unless the foam proportioner is operative to introduce foam into the system. Briefly stated, this system comprises an interlock including a pressure switch for sensing the water pressure delivered by the pump and a means for sensing the operation of the foam proportioner.

In accordance with another feature of the invention, there is provided an air pressure relief valve means which is operative to close the air inlet flow to the compressor in response to the occurrence of an excessive pressure condition at the delivery side of the compressor.

DETAILED DESCRIPTION OF THE PREFERRED EMBODIMENT

Figure 1:
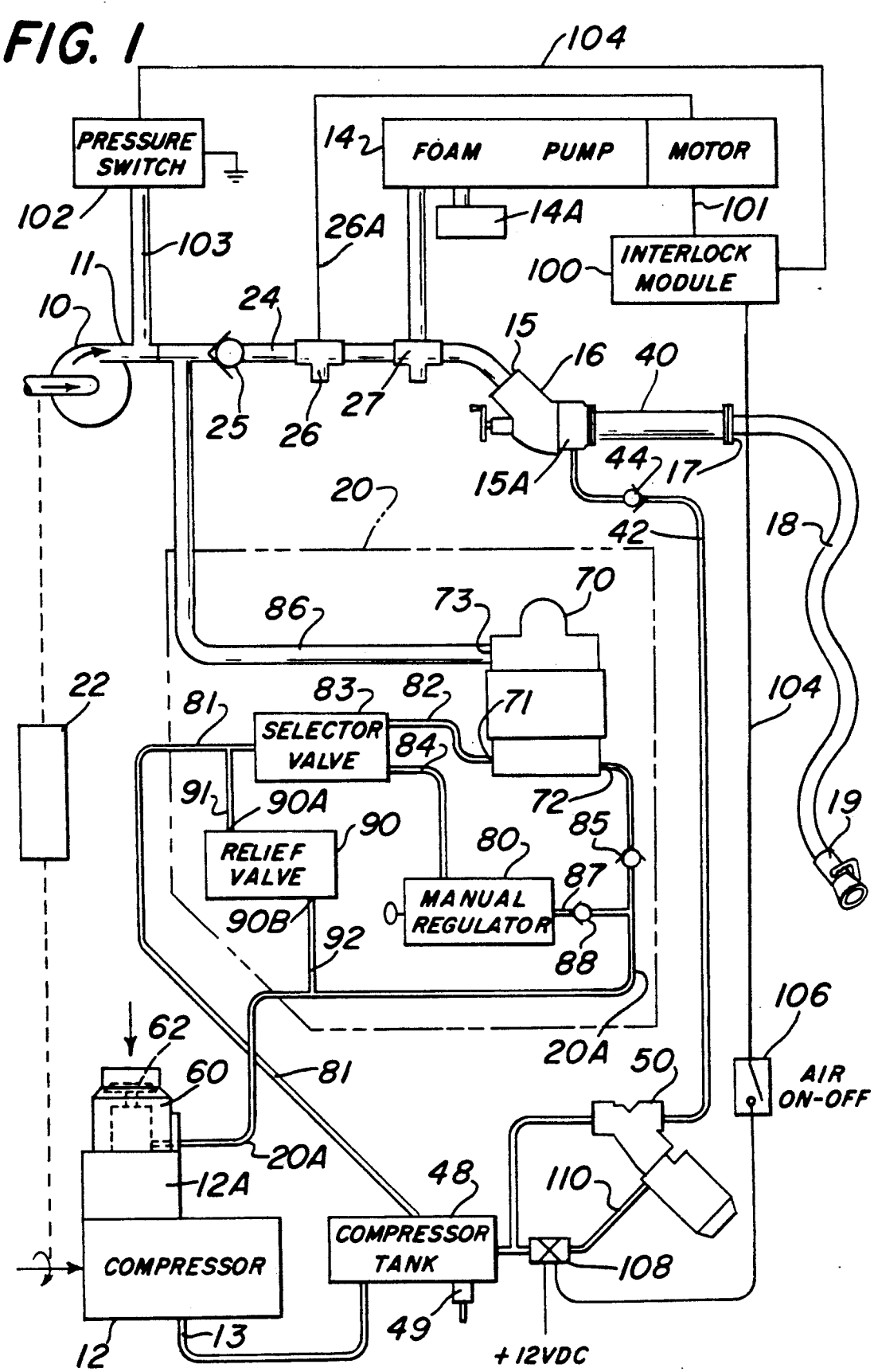
FIG. 1 is a schematic view of a compressed air foam system in accordance with the invention.

The main components of the compressed air foam system of the invention are a fire pump 10, an air compressor 12, a foam proportioner 14, a venturi means 16, a fire stream delivery means 18, and an air control means 20 for regulating the pressure of the air supplied to the venturi means 16.

Fire pump 10 is a suitable water pump which delivers water under pressure from a discharge 11 thereof. Fire pump 10 may comprise, by way of example, a QG 150 midship pump manufactured by Hale Fire Pump Company, said pump being a two-stage centrifical pump which has impellers mounted on a rotating drive shaft.

Air compressor 12 is preferably a sliding-vane type of rotary compressor of a conventional construction and comprises a rotating drive shaft. By way of example, compressor 12 is constructed to operate at up to 400 cubic feet per minute. The drive for compressor 12 may include a clutch means which can be disengaged when it is desired to prevent operation of the compressor 12.

A transmission means 22 of the type disclosed in U.S. Pat. No. 5,145,014 is provided to cause rotation of the drive shafts of both the fire pump 10 and compressor 12 from the transmission on the fire truck. As is described in said patent, transmission means 22 includes a split shaft gear box arranged to cause rotation of the drive shafts of the fire pump 12 and compressor 12 whereby said shafts are caused to rotate at a set proportional speed.

There is provided a water supply conduit means 24 for delivering water under pressure from the pump discharge 11 to the inlet 15 of the venturi means 16. Such means comprises a flow line extending between discharge 11 of fire pump 10 and the inlet 15 of venturi means 16 and having connected therein, in the direction of flow, a check valve 25, a flowmeter 26, and an injector 27. Check valve 25 is constructed and arranged to permit flow in the direction from discharge 11 to the inlet 15 of the venturi means 16 and block flow in the opposite direction. Flowmeter 26 and injector 27 are connected as part of the flow proportioner 14 as will be described hereafter.

Flow proportioner 14 may be of any suitable type well known in the art, such as the one used in the Foam-Pro 2001 series electronic injection automatic foam proportioning system manufactured by Hypro Corporation of New Brighton, Minn. In this type of system, foam proportioner 14 is constructed to comprise a foam concentrate pump and a motor for driving the pump, as is shown in FIG. 1. This type of system operates to monitor the water flow through the flowmeter 26. In operation, in response to an electrical signal transmitted via control means 26A to the flow proportioner motor, the amount of the foam concentrate delivered from a foam concentrate supply tank 14A to conduit means 24 through the injector 27 is controlled to be at a specified injection rate pursuant to the setting of the system. In order to protect the pump and motor of this system, there is typically provided an arrangement whereby the pump is interlocked with a foam concentrate supply tank float switch so that if the tank 14A is empty, said pump will not run.

Figure 3:
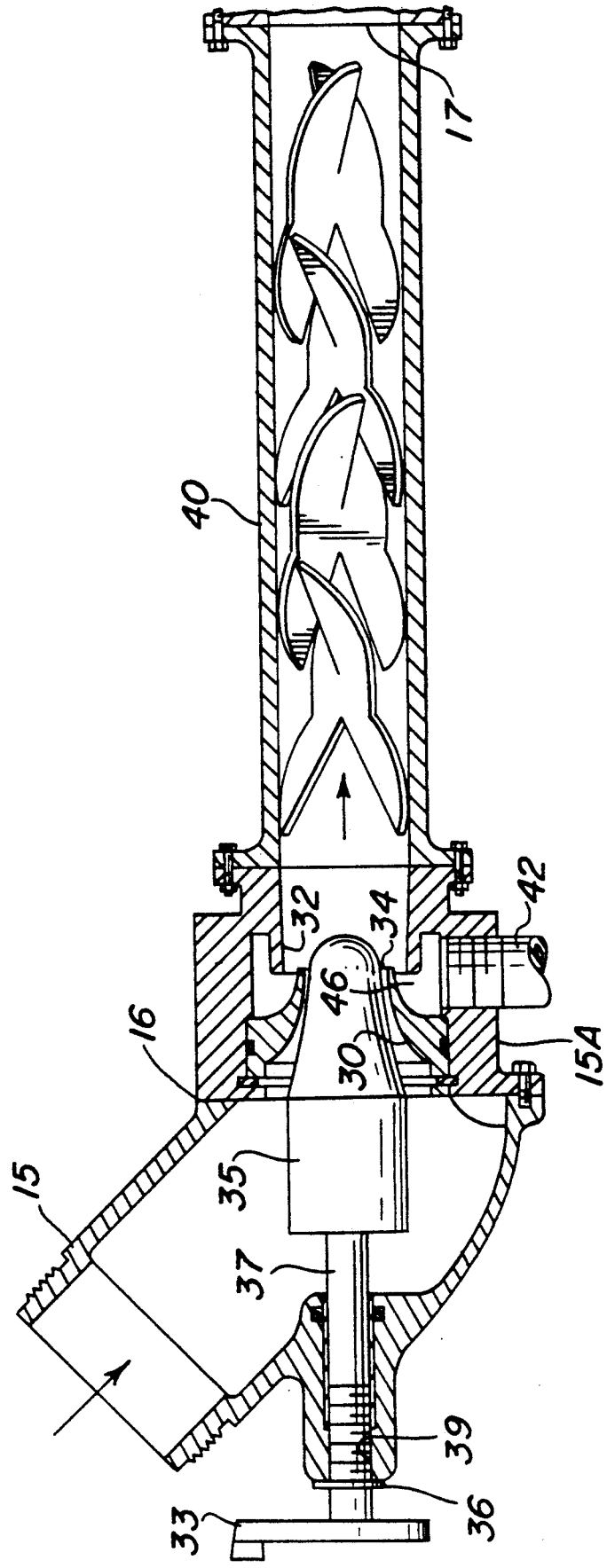
FIG. 3 is a sectional view of a variable area venturi means used in the system shown in FIG. 1.

As best shown in FIG. 3, venturi means 16 comprises an inlet 15, a venturi section 15A including a converging portion 30, a diverging portion 32, and a constricted throat 34 located between portions 30 and 32 as is conventional in venturi type devices. Inlet 15 is connected to the downstream end of the conduit means 24 as shown in FIG. 1. The downstream end of diverging portion 32 is connected to direct the flow from the venturi means 16 into a conventional mixer 40. The mixer 40 is connected at its downstream to the upstream end 17 of the fire hose of the fire stream delivery means 18 as is shown in FIG. 1.

Venturi means 16 is provided with a novel construction whereby the flow through the venturi means 16 is adjustable. To this end, a pintle-like member 35 is mounted to extend through the converging portion 30 into the throat 34 and to be movable into and out of the converging portion 30 to provide a variable area of the throat 34. This design makes it possible to extend the range of the venturi means 16 to provide wet foam to dry foam solutions over a fairly broad flow range. This is achieved by adjusting the ratio of the amount of water and air to provide different types of foam solutions. The foam solutions are varied between a wet foam solution that has a high percentage of water and a dry foam solution that has more air than the wet foam solution.

Pintle member 35 is supported on the end of a threaded shaft 37 which is threadedly engaged in a bore 39 in the body of venturi means 16 to project therefrom. The extended end of shaft 37 has a handle 33 secured thereon for causing rotation of shaft 37 whereby the shaft 37 and pintle member 35 can be adjusted axially to various flow control positions. In FIG. 3, pintle member 35 is shown in its extreme right hand position, which occurs when a stop 36 secured on the extended end of shaft 37 comes into contact with a shoulder on the body of the venturi means 16, as shown in FIG. 3. The pintle member 35, as a result of rotation of the threaded shaft 37 by means of handle 33, can be adjusted to various positions to the left of that shown in FIG. 3. As the pintle member 35 is moved to the left away from the throat 34, the size of the flow area through the constricted throat 34 is increased. It will be noted that in its extreme right hand position, the pintle member 35 still allows a minimum amount of liquid to flow through the constricted throat 34. In the right hand position shown in FIG. 3, the venturi means 16 is set to produce the driest foam. As the pintle member 35 is moved toward the left to increase the size of the flow area through the throat 34, more water will be admitted to allow the foam solution to become wetter and wetter.

Mixer 40 is a conventional type of mixer which is provided with a plurality of vanes which function to create turbulence without losing much pressure as the mixture of foam solution and air flow from the venturi means 16 to the upstream end 17 of the fire stream delivery means 18. The mixer 40 is particularly useful when the fire stream delivery means 18 is a deck gun where there is a minimum length of pipe between the venturi means 16 and the inlet to the fire stream delivery means 18. Mixers of this type are known in the art as stationary mixers and function to enhance mixing by adding turbulence to the flow while keeping the pressure loss to a minimum.

The fire stream delivery means 18 can take various forms, such as a deck gun or one or more fire hoses with nozzles at the end thereof. In FIG. 1, the fire stream delivery means 18 is shown as a single fire hose having a nozzle 19 at the end thereof.

There is provided an air conduit means 42 for delivering air to the venturi section 15A of venturi means 16. Such conduit means 42 comprises a flow line having its downstream end connected to a chamber 46 surrounding the area of the throat 34 of the venturi section 15A of the venturi means 16 and arranged to be in flow communication with throat 34, as is best shown in FIG. 3. The flow line forming the air conduit means 42 has a check valve 44 connected therein constructed and arranged to permit flow therethrough into the chamber 46 of the venturi means 16 and to prevent flow in the opposite direction. The flow line forming the air conduit means 42 also has a control valve 50 connected therein for controlling flow therethrough. The control valve 50 is actuatable between open and closed positions in a manner to be described more fully hereafter.

The air compressor 12 is arranged to deliver air at a delivery pressure to the upstream end of air conduit means 42. To this end, the discharge 13 of compressor 12 is connected to a compressor tank 48 which provides a supply of compressed air at the compressor discharge pressure. The upstream end of air conduit means 42 is connected to the compressor tank 48 to receive a supply of air at the compressor discharge pressure whereby conduit means 42 delivers said air to the venturi chamber 46 through the control valve 50 and the check valve 44.

Air is supplied to compressor 12 through an inlet 12A. An inlet throttling valve means 60 is constructed and arranged for varying the flow of air to the inlet 12A of compressor 12 to thereby control the compressor discharge pressure. In order to control the compressor discharge pressure, the inlet throttling valve 60 is provided with a control valve member 62 which cooperates with a valve seat 64 to vary the amount of the air flow to the compressor inlet 12A in response to a pilot or control air pressure directed to a flow control chamber as will be described hereafter. The control valve member 62 is constructed and arranged to be positioned relative to valve seat 64 to control the amount of air entering the air compressor 12 through inlet 12A until the output air pressure matches a desired set value of the system.

Figure 4:
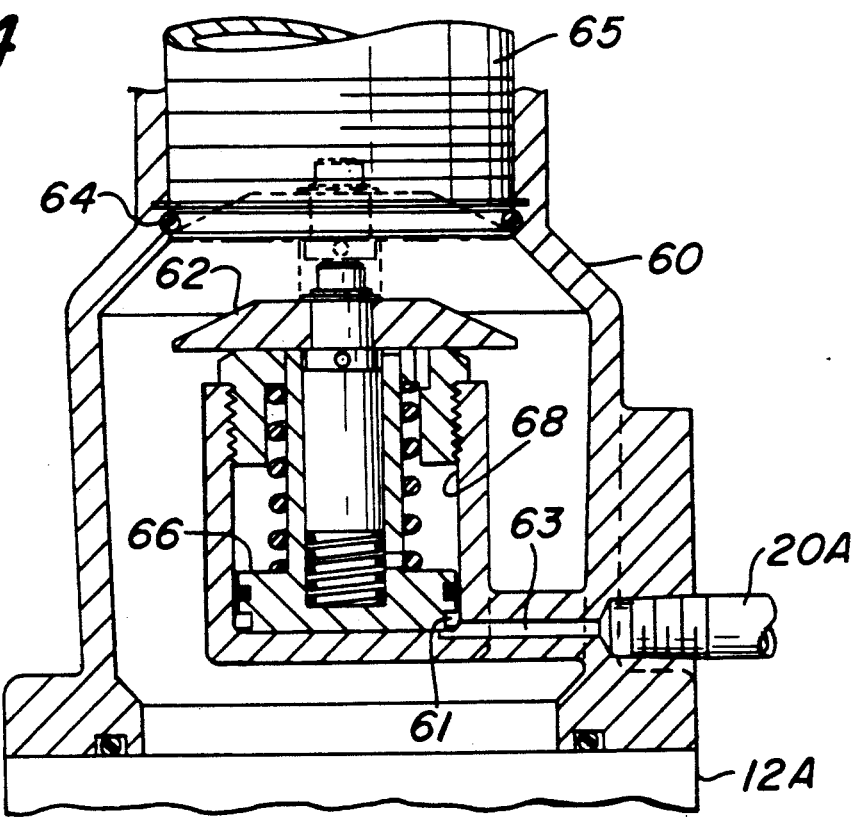
FIG. 4 is a sectional view of an inlet throttling valve means for the air compressor used in the system shown in FIG. 1.

The inlet throttling valve 60 is of a type well known in the art and is shown in detail in FIG. 4. As shown in FIG. 4, the inlet throttling valve 60 comprises control valve member 62 which is mounted for movement with a control piston 66 guided for movement in a cylinder 68 which defines a control chamber 61 at the one (lower) side of the control piston 66. The pilot or control pressure is delivered to the control chamber 61 by way of a passage 63 formed in the body of valve 60, the upstream end of passage 63 being in flow communication with a flow line 20A communicating therewith and mounted in the side of the body of valve 60 as shown in FIG. 4. Flow line 20A delivers the pilot or control air pressure to valve 60 so that it, in effect, controls or modulates the compressor discharge pressure. The control valve member 62 cooperates with valve seat 64 and moves between the solid line (or fully opened) position shown in FIG. 4 and a closed position as shown in dotted lines in FIG. 4. The upstream side of the valve seat 64 is connected to atmosphere by a inlet tube 65 as is conventional in the art.

Flow line 20A, which delivers the pilot or control air pressure to valve 60 in order to control or modulate the compressor discharge pressure, is part of the air control means 20 which is constructed and arranged to regulate the air pressure in flow line 20A. To this end, air control means 20 comprises an air pressure regulator 70 having an air inlet 71, an air outlet 72, and a water inlet 73. A conduit means, comprising a pair of flow lines 81 and 82 and a selector valve 83 is constructed and arranged for communicating the compressor discharge pressure to air inlet 71 of regulator 70. Flow line 81 is connected between compressor tank 48 and the inlet of selector valve 83. Flow line 82 is connected between an outlet of selector valve 83 and air inlet 71 of regulator 70. Selector valve 83 can be set to a first selecting position wherein flow line 81 is in flow communication with flow line 82 and a second selecting position wherein flow line 81 is in flow communication with a flow line 84 which is connected to the inlet of a manual regulator 80 for a purpose to be described hereafter. A conduit means, comprising flow line 20A, is constructed and arranged for communicating the air outlet 72 of regulator 70 with the passage 63 leading to control chamber 61 of inlet throttling valve 60. Flow line 20A has a check valve 85 connected therein constructed and arranged to provide flow in the direction from air outlet 72 to inlet throttling valve 60 and to block flow in the opposite direction. A conduit means, comprising a flow line 86, is constructed and arranged for communicating the water supply conduit means 24 to the water inlet 73 of regulator 70. To this end, flow line 86 is connected to the water conduit means 24 at a location immediately adjacent the compressor discharge 11 and has its downstream end connected to water inlet 73 of regulator 70.

Air pressure regulator 70 is constructed and arranged to vary the pressure of the air communicated by flow line 20A to the control chamber 61 of inlet throttling valve 60 in response to both the compressor discharge pressure delivered to air inlet 71 of pressure regulator 70 and the pump discharge water pressure delivered to water inlet 73 of regulator 70 through flow line 86 to automatically maintain the compressor air discharge pressure at a desired relationship relative to the fire pump water discharge pressure. Accordingly, the system in accordance with the invention automatically maintains a desired ratio of air and water delivered from the discharge of the venturi means 16 to the fire stream delivery means. Thus, briefly stated, air pressure regulator 70 takes a signal from the water pressure discharge at 11 and a signal from the air pressure discharge at tank 48 and modulates the inlet flow to the air compressor 12 to hold the water pressure and the air pressure constant, and more specifically, to match the water pressure and air pressure to maintain a balanced water pressure and air pressure, such as, for example, at a pressure of 100 PSI.

Figure 2:
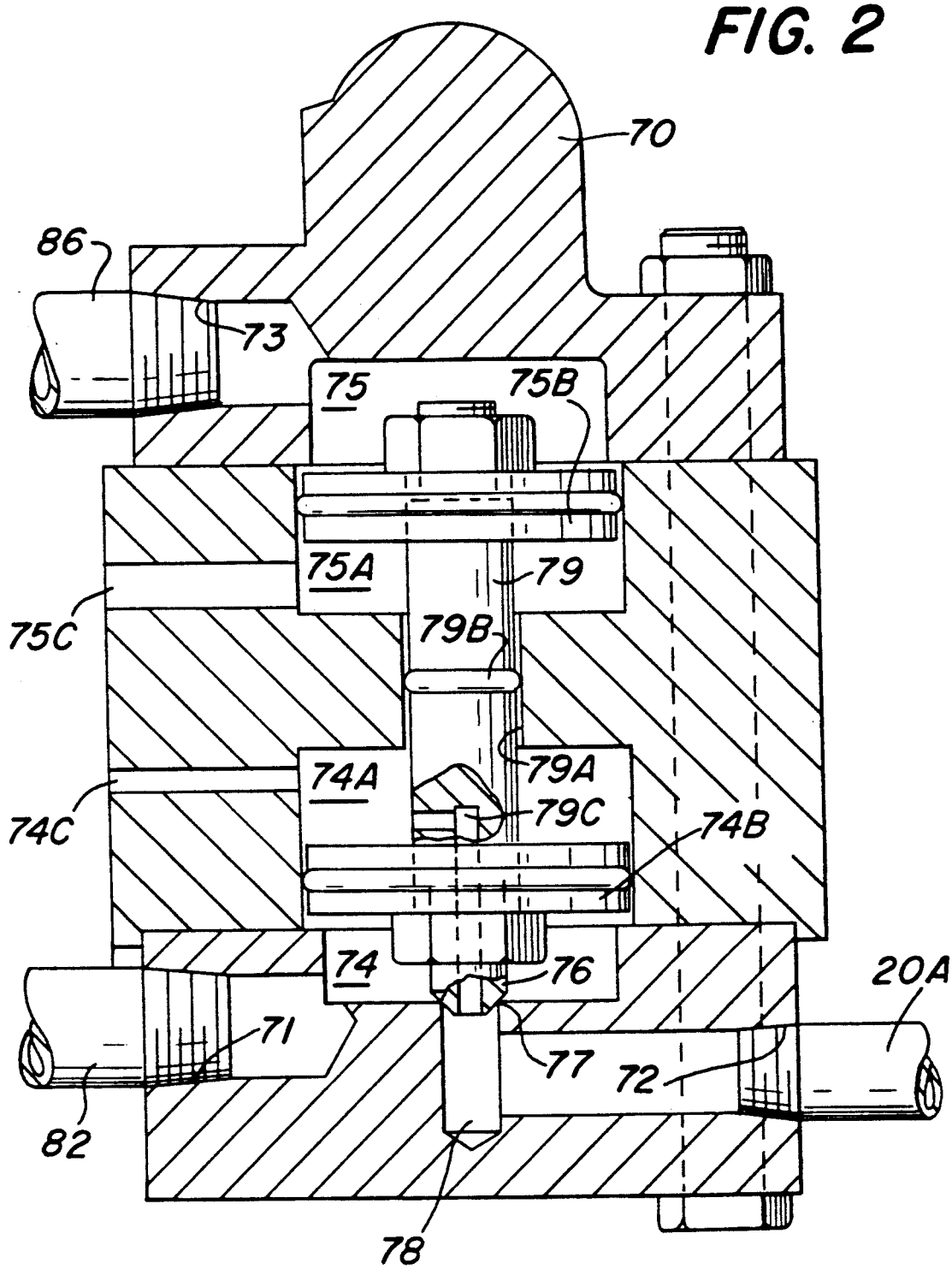
FIG. 2 is sectional view of an air pressure regulator used in the system shown in FIG. 1.

The above-described function of the air pressure regulator 70 is achieved by a construction shown in detail in FIG. 2. Regulator 70 comprises an air control chamber 74, which is arranged to receive the flow of air through air inlet 71, and a water control chamber 75, which is arranged to receive the flow of water through the water inlet 73, whereby the air pressure in control chamber 74 is at the compressor discharge pressure and the water pressure in chamber 75 is at the fire pump delivery pressure. A control valve member 76 is arranged to cooperate with a valve seat 77 to regulate the flow of air from the chamber 74 through a passage 78 to the air outlet 72 and flow line 20A. Valve member 76 is mounted on the lower end of a valve stem 79 which is guided for movement in a bore 79A in the body of regulator 70 such that valve member 76 moves toward and away from valve seat 77 to regulate the flow of air from air control chamber 74 to the flow line 20A. Means are provided to make valve stem 79 responsive to the pressures in control chambers 74 and 75. To this end, there is provided a piston 74B, which is connected to valve stem 79 and is responsive to the pressure in air control chamber 74, and a piston 75B, which is connected to the upper end of valve stem 79 and is responsive to the water pressure in water control chamber 75, as is apparent from a consideration of FIG. 2.

There is provided a chamber 74A located on the side of piston 74B opposite control chamber 74 and a restricted passage 74C for venting chamber 74A to atmosphere. There is also provided a chamber 75A located on the side of piston 75B opposite control chamber 75 and a passage 75C for venting chamber 75A to atmosphere. There is provided an O-ring seal 79B between valve stem 79 and bore 79A to provide a seal between the air in chambers 74A and 75A. The air pressure in chamber 74A is at a pressure higher than the atmospheric pressure in chamber 75A.

Valve stem 79 has an internal passage 79C extending between chamber 74A and passage 78. Passage 79C serves to maintain chamber 74A at a pressure higher than atmospheric pressure.

In the operation of the air pressure regulator 70, when the water pressure and the air pressure are balanced, valve stem 79 positions valve member 76 to be unseated from valve seat 77 a proper distance to allow the proper control pressure to be delivered through flow line 20A t the inlet throttling valve 60. This control pressure will cause the throttling valve 60 to provide the proper flow to the compressor inlet 12A so that compressor 12 maintains the proper balanced air discharge pressure that is desired.

A feature of the air regulator 70 is that as the valve member 76 unseats relative to the valve seat 77, there is a certain amount of damping of this movement by reason of the air pressure in chamber 74A (which is higher than atmospheric pressure) and the restricted passage 74C which controls the bleeding of air from chamber 74A to atmosphere. Thus, if there is a quick reduction in the water pressure, the response of the valve stem 79 is damped by reason of the requirement that the air in chamber 74A must be pushed out of a restricted passage 74C, which serves to dampen the movement of the valve stem 79. This also prevents this system from "hunting" as the valve stem 79 is moved in order to respond to water pressure changes.

Manual regulator 80 is of any conventional type well known in the art and comprises a control valve member which is connected to a pressure responsive diaphragm which is responsive to the pressure in a control chamber connected to the downstream end of flow line 84. Regulator 80 is adjusted manually by a handle which adjusts a spring to maintain a desired pressure on the diaphragm in a direction opposite to the air pressure applied to the diaphragm in the control chamber. In use, the manual regulator 80 is set by the operator to that pressure of the system which will balance the water pressure. However, as was stated above, the water pressure can vary widely during fire fighting operations by reason of the varying conditions at the fire stream delivery means. The outlet of the manual regulator is delivered through a flow line 87 having a check valve 88 therein to the flow line 20A whereby the pressure delivered through manual regulator 80 can be used to control the compressor discharge pressure by way of the inlet throttling valve 60 as discussed above. Manual regulator 80 is used as a back up to the automatic regulator 70 and is selected for use by positioning the selector valve 83 to connect flow lines 81 and 84 as discussed above.

Compressor tank 48 is provided with a conventional pressure relief valve 49 which prevents the system from being subjected to a high pressure which could cause damage to the components thereof. By way of example, relief valve 49 is set to open the compressor tank 24 to atmosphere when the pressure in the tank 48 reaches a pressure of 200 PSI. In accordance with the invention, air control means 20 is provided with a relief valve means comprising a relief valve 90 and a pair of flow lines 91 an 92. Flow line 91 is connected between flow line 81 and an inlet 90A to relief valve 90. Flow line 92 is connected between a relief discharge 90B of relief valve 90 and flow line 20A which delivers the pilot or control pressure to the inlet throttling valve 60. The pressure relief valve means of the air control means 20 is constructed and arranged to deliver a pressure signal through the relief discharge 90B thereof (and flow line 20A) to the inlet throttling valve 60 to close the same and block inlet flow to the compressor 12 to thereby maintain the air pressure in the system. The relief valve 90 is set to operate at a lower relief pressure than relief valve 49, such as for example, at 180 PSI as compared with 200 PSI for relief valve 49. An important advantage of the relief valve means described above over the standard type of relief valve, such as relief valve 49, which dumps air from the compressor discharge or receiver tank 48, is that the standard type of relief valve will also dump lubricating oil from said tank. This requires the attention of the operator to refill the lost oil before continuing operation.

Figure 5:
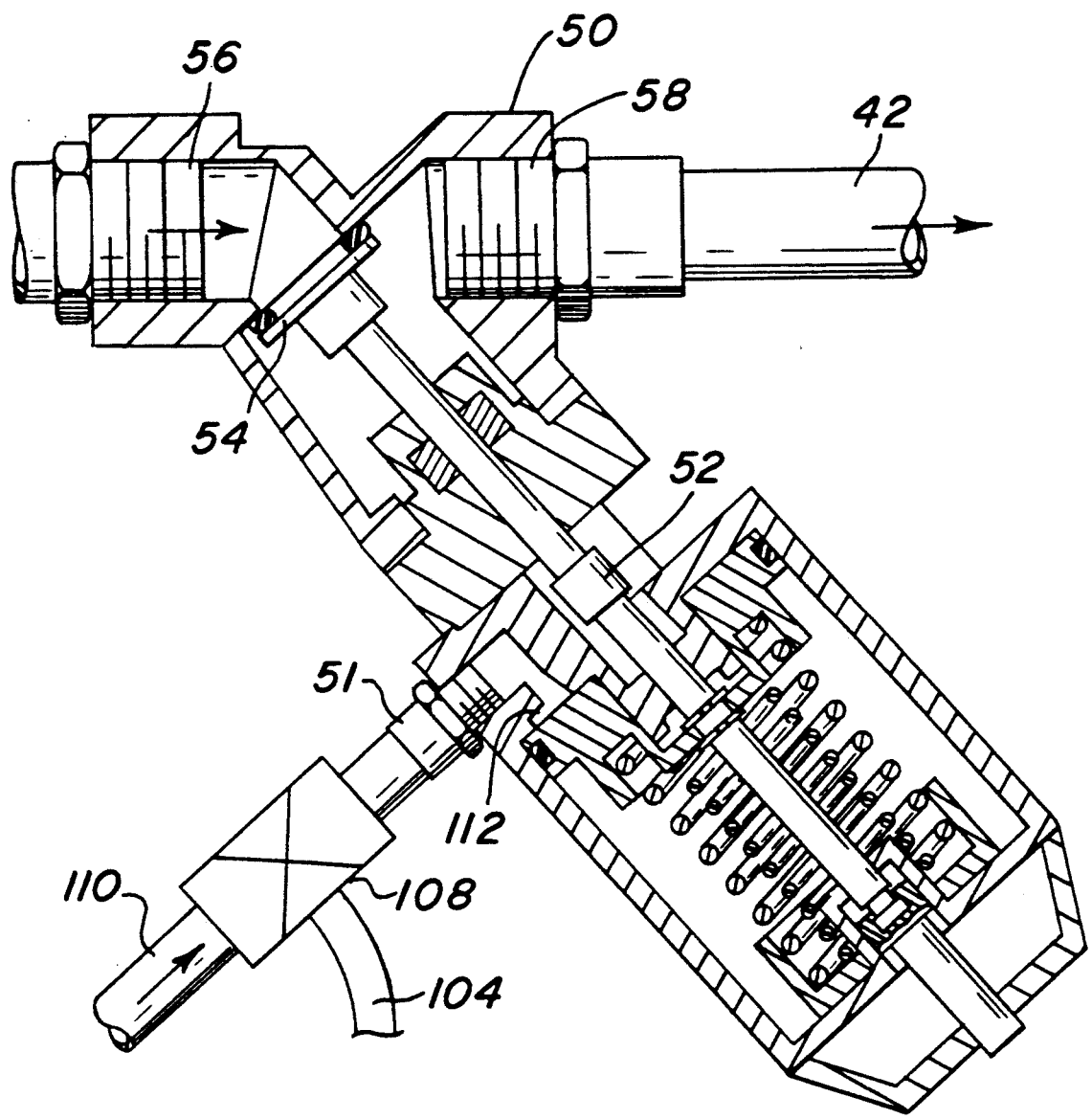
FIG. 5 is a sectional view of an air flow control valve means used in the system shown in FIG. 1.

In accordance with another feature of the invention there is provided a safety means so that the air flow cannot be introduced into the venturi means 16 unless two things occur, namely, (1) the fire pump is delivering water to conduit means 24 and (2) the foam proportioner 14 is operative to introduce foam into the system. This safety means comprises an electrical circuit means including a conventional interlock 100 which includes an electrical relay switch connected in series with pressure switch 102. Pressure switch 102 is arranged to sense the water pressure at the water pump discharge 11 by means of a line 103 and closes the circuit when fire pump 10 is operative to deliver water to conduit means 24. The relay switch of interlock 100 is controlled by a relay circuit which includes a line 101 which senses that the motor of the pump of foam proportioner 14 is operating and is arranged to close this relay switch. When both the relay switch of the interlock 100 and the pressure switch 102 are closed, a circuit is completed through the electrical line 104 which includes a manual air ON-OFF switch 106 and a solenoid coil of a solenoid operated flow control valve 108. The parts are constructed and arranged so that when both the pressure switch 100 and the relay switch of the interlock 100 are closed, and when air ON-OFF 106 switch is closed. An electrical circuit passes through the solenoid coil of the solenoid operated control valve 108 to actuate the same to an open position which allows air to flow from the compressor tank 48 through a flow line 110 to a control chamber 112 of flow control valve 50. Flow line 110 directs the pilot air flow to valve 50 to effect opening thereof when there is air pressure in tank 48, and, as shown in FIGS. 1 and 5, flow line 110 is connected between tank 48 and the inlet 51 to control chamber 112. Valve 50 is a conventional air pilot-operated valve provided with a normally closed solenoid valve 108 and may be, for example, a Series 211-212 valve provided with a Series 885 signal box and a Series 107 solenoid valve (normally closed), all manufactured by ASCO Pneumatic Controls Co., Joucomatic Division. Valve 50 is shown in detail in FIG. 5 and, as is conventional, comprises a piston-actuated valve stem 52 which carries a valve member 54 which controls the air flow between an inlet 56 and an outlet 58. As shown in FIG. 5, valve 50 is connected to control the flow through conduit 42, which is connected between the compressor tank 48 and the throat 34 of the venturi means 16 as described above.

In the use of the compressed air foam system in accordance with the invention, when the selector valve 83 is set to the selector position wherein the pressure in compressor tank 48 is delivered through flow lines 81 and 82 to the air inlet 71 of air regulator 70, the system will operate to maintain the compressor discharge pressure in tank 48 at a pressure which matches the water pump pressure delivered at the discharge 11. Accordingly, when the water and foam solution is passed through the venturi section 15A of venturi means 16, it will produce a pressure drop at the throat 34 which is proportional to the flow and will draw in the desired amount of air through line 42 to mix with the water/foam solution to produce the desired wetness of the aerated foam delivered to fire stream delivery means 18. The arrangement is such that as the water flow increases it will produce a greater pressure difference between the air and water at the throat 34 of the venturi section 15A of venturi means 16 whereby the venturi means 16 functions like a carburetor and will draw in more air through flow line 42 into the flow to match the increased water flow. Accordingly, the ultimate result is that the system controls the water and air flow by balancing the water pressure and air pressure and mixing the water and air at the throat 34 of the venturi means 16 to produce the desired result. It is thus possible to achieve wetter or drier aerated foams by adjusting the size of the flow area at the throat 34 of the venturi means 16. Thus, by keeping the pressures at the water pump discharge and the air compressor discharge balanced, it is possible to vary the wetness of the aerated foam by adjusting the venturi means 16 as discussed above. The driest foam is achieved when the flow area of the venturi throat 34 is adjusted to its smallest size, as shown by the solid line position in FIG. 3. When it is desired to provide wetter foam solutions, the venturi throat area is made larger by adjusting the pintle member 35 toward the left from the position shown in FIG. 3.

It is to be noted that the venturi means 16 is a flow based device and, since the air pressure at the throat 34 and the water pressure at venturi inlet 15 are equal, the venturi means 16 is insensitive to system back pressures (which pressure could vary as a result of changes occurring at fire stream delivery means 18) and therefore maintains the desired proportioned air and foam solution mixture in all situations.

Figure 6:
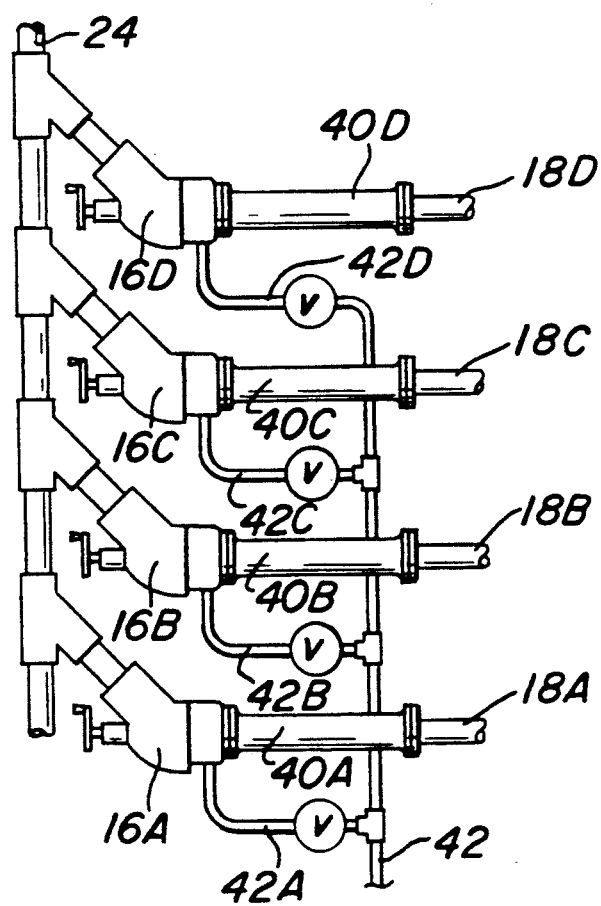
FIG. 6 is a view of an alternate embodiment of the system employing multiple venturi means.

FIG. 6 shows an alternate embodiment of the invention wherein there are provided a plurality of venturi means 16A-16D which are controlled by the air control system 20. Thus, the venturi means 16A, 16B, 16C, and 16D are arranged to receive the air control pressure from line 42 by way of valve controlled flow lines 42A, 42B, 42C, and 42D, respectively. The multiple venturi arrangement shown in FIG. 6 is otherwise connected to the system shown in FIG. 1 and will operate in the same manner described hereinbefore to control the flow of aerated foam to one or more of a plurality of fire stream delivery means 18A 18D in FIG. 6 by way of mixers 40A-40D, respectively.

What is claimed is:

1. A system for supplying compressed air and foam solution to produce a fire stream comprising an aerated foam comprising
   a venturi means having an inlet, a discharge, and a constricted throat section,
   a fire stream delivery means constructed and arranged to receive fluid flow from the discharge of said venturi means,
   a fire pump means for delivering water under pressure from a discharge thereof,
   a water supply conduit means for delivering water from the discharge of said pump means to the inlet of said venturi means,
   a foam proportioner for delivering foam chemical to said water supply conduit means,
   air conduit means for delivering air to the throat section of said venturi means,
   an air compressor for delivering air at a delivery pressure to said air conduit means, said compressor having an inlet and a discharge,
   an inlet throttling valve means for varying the flow of air to said compressor inlet to thereby control the compressor discharge pressure, said inlet throttling valve having a control chamber and a valve member responsive to the pressure in said control chamber for varying the flow of air to said compressor inlet, and
   air control means for regulating the pressure of the air supplied to said control chamber of said inlet throttling valve means including
   an air pressure regulator having an air inlet, an air outlet, and a water inlet,
   a first conduit means for communicating the compressor discharge pressure to said air inlet of said air pressure regulator,
   a second conduit means for communicating the air outlet of said air pressure regulator to said control chamber of said inlet throttling valve,
   and a third conduit means for communicating said water supply conduit means to said water inlet of said air pressure regulator,
   said air pressure regulator being constructed and arranged to vary the pressure of the air communicated by said second conduit means to said control chamber in response to the compressor pressure delivered to said air inlet through said first conduit means and the water pressure delivered to said water inlet through said third conduit means to automatically maintain the compressor air discharge pressure at a desired relationship relative to said fire pump water discharge pressure whereby said system automatically maintains a desired ratio of air and water delivered from the discharge of said venturi means.

2. A system according to claim 1 wherein said venturi means comprises means for varying the size of the flow area of said constricted throat section, said means being adjustable for movement to a plurality of positions whereby said venturi can be set to operate over a range of flows to adjust the ratio of water and air delivered therethrough to the venturi discharge.

3. A system according to claim 1 comprising a pressure relief valve means having an inlet and a relief discharge, and fourth conduit means for connecting the inlet of said pressure relief valve to sense the discharge pressure of said air compressor and fifth conduit means for connecting the discharge of said relief valve to said second conduit means connected to said control chamber of said inlet throttling valve, said pressure relief valve means being constructed and arranged to deliver a pressure through said relief discharge thereof and said fifth conduit means to said inlet throttling valve means to close the same and block inlet flow to the compressor to thereby maintain the air pressure in the system at a desired pressure.

4. A system according to claim 1 comprising an air safety interlock means including
   an air control valve for controlling flow through said air conduit means and being actuatable between a closed position blocking flow through said air conduit means and an open position permitting flow through said air conduit means,
   and means for actuating said air control valve from said first position to said second position in response to the sensing of the operation of both said fire pump to deliver water under pressure to the discharge thereof and said foam proportioner to deliver foam to said water supply conduit means.

5. A system according to claim 1 wherein said air pressure regulator comprises a valve member operable for controlling the flow of air from said air inlet to said air discharge thereof, a valve stem operatively connected to said valve member for causing movement thereof, an air pressure responsive means operatively connected to said valve stem, a water pressure responsive means operatively connected to said valve stem, said water pressure responsive means being responsive to the pressure of the water delivered to said air pressure through said water inlet to actuate said valve stem in a first direction, said air pressure responsive means being responsive to the pressure of the air delivered to said air pressure regulator through said air inlet for actuating said valve stem in a second direction opposite to said first direction.

6. A system according to claim 1 including a manual air pressure regulator having an inlet and an outlet and constructed and arranged to be manually set for regulating the pressure of the air supplied to said control chamber of said inlet throttling valve means in accordance with said manual setting, and selector valve means for communicating the compressor discharge pressure from said first conduit means to said inlet of said manual pressure regulator or to said inlet of said first-named air pressure regulator.

7. A system for supplying compressed air and foam solution to produce a fire stream comprising an aerated foam comprising
    a venturi means having an inlet, a discharge, and a constricted throat section,
    a first stream delivery means constructed and arranged to receive fluid flow from the discharge of said venturi means,
    a first pump for delivering water under pressure from a discharge thereof,
    a water supply conduit means for delivering water from the discharge of said pump to the inlet of said venturi means, a foam proportioner for delivering foam chemical to said water supply conduit means,
    air conduit means for delivering air to the throat section of said venturi means,
    an air compressor for delivering air at a delivery pressure to said air conduit means, said compressor having an inlet and a discharge,
    an inlet throttling valve means for varying the flow of air to said compressor inlet to thereby control the compressor discharge pressure, said inlet throttling valve having a control chamber and a valve member responsive to the pressure in said control chamber for varying the flow of air to said compressor inlet, and
    air control means for regulating the pressure of the air supplied to said control chamber of said inlet throttling valve means in accordance with the pressure of the water delivered from the discharge of said fire pump and the delivery pressure of said air compressor to automatically maintain the compressor air discharge pressure at a desired relationship relative to said fire pump water discharge pressure.

8. A system according to claim 7 comprising
    at least one additional venturi means having an inlet, a discharge, and a constricted throat section,
    said fire stream delivery means being constructed and arranged to receive fluid flow form the discharge of said additional venturi means,
    said water supply conduit means being constructed and arranged to deliver water from the discharge of said pump to the inlet of said additional venturi means,
    said air conduit means being constructed and arranged to deliver air to the throat section of said additional venturi means.

9. A system for supplying compressed air and foam solution to produce a fire stream comprising an aerated foam comprising
    means for mixing air and foam solution having a foam solution inlet, a discharge, and an air inlet,
    a fire stream delivery means constructed and arranged to receive fluid flow from the discharge of said mixing means,
    a fire pump for delivering water under pressure from a discharge thereof,
    a water supply conduit means for delivering water from the discharge of said pump to the foam solution inlet of said mixing means,
    a foam proportioner for delivering foam chemical to said water supply conduit means so that a foam solution is delivered to said foam solution inlet,
    air conduit means for delivering air to said air inlet of said mixing means,
    an air compressor for delivering air at a delivery pressure to said air conduit means, said compressor having an inlet and a discharge, and
    an air safety interlock means including
    an air control valve for controlling flow through said air conduit means and being actuatable between a closed position blocking flow through said air conduit means and an open position permitting flow through said air conduit means,
    and means for actuating said air control valve from said closed position to said open position in response to the sensing of the operation of both said fire pump to deliver water under pressure to the discharge thereof and said foam proportioner to deliver foam chemical to said water supply conduit means.

10. A system according to claim 9 comprising an inlet throttling valve means for varying the flow of air to said compressor inlet to thereby control the compressor discharge pressure, said inlet throttling valve means including a control chamber and a valve member responsive to the pressure in said control chamber for varying the flow of air to said compressor inlet, a pressure relief valve means having an inlet and a relief discharge, conduit means for connecting the inlet of said pressure relief valve means to sense the discharge pressure of said air compressor, and control conduit means for connecting the discharge of said relief valve means to said control chamber of said inlet throttling valve means, said pressure relief valve means being constructed and arranged to deliver a pressure through said relief discharge thereof and said control conduit means to said inlet throttling valve means to close the same and block inlet flow to the compressor to thereby maintain the air pressure in the system at a desired pressure.

11. A system according to claim 10 comprising an air control means for regulating the pressure of the air supplied to said control chamber of said inlet throttling valve means in accordance with the pressure of the water delivered from the discharge of said fire pump and the delivery pressure of said air compressor to automatically maintain the compressor air discharge pressure at a desired relationship relative to said fire pump water discharge pressure.

12. A system for supplying compressed air and from solution to produce a fire stream comprising an aerated from comprising means for mixing air and foam solution having a foam solution inlet, a discharge, and an air inlet, a fire stream delivery means constructed and arranged to receive fluid flow from the discharge of said mixing means, a first pump for delivering water under pressure from a discharge thereof, a water supply conduit means for delivering water from the discharge of said pump to the foam solution inlet of said mixing means, a foam proprotioner for delivering foam chemical to said water supply conduit means so that a foam solution is delivered to said foam solution inlet, air conduit means for delivering air to said air inlet of said mixing means, an air compressor for delivering air at a delivery pressure to said air conduit means, said compressor having an inlet and a discharge, an inlet throttling valve means for varying the flow of air to said compressor inlet to thereby control the compressor discharge pressure, said inlet throttling valve having a control chamber and a valve member responsive to the pressure in said control chamber for varying the flow of air to said compressor inlet, and an air control means for regulating the pressure of the air supplied to said control chamber of said inlet throttling valve means in accordance with the pressure of the water delivered from the discharge of said fire pump and the delivery pressure of said air compressor to automatically maintain the compressor air discharge pressure at a desired relationship relative to said fire pump water discharge pressure.

* * * * *

UNITED STATES PATENT AND TRADEMARK OFFICE
CERTIFICATE OF CORRECTION

PATENT NO. : 5,255,747
DATED : October 26, 1993
INVENTOR(S) : Teske et al.

It is certified that error appears in the above-indentified patent and that said Letters Patent is hereby corrected as shown below:

On the title page, Abstract, line 2, change "first" to --fire--.

Column 7, line 1, change "t" to --to--.

Column 8, line 29, change ". An" to --, an--.

Column 11, lines 29 and 32, change "first" to --fire--.

Column 12, lines 66 and 68, change "from" to --foam--.

Column 13, line 7, change "first" to --fire--.

Signed and Sealed this

Nineteenth Day of April, 1994

Attest:

BRUCE LEHMAN

Attesting Officer  Commissioner of Patents and Trademarks